June 18, 1963  L. F. WHITMAN  3,093,947
HORIZONTALLY ADJUSTABLE ROTATING DISK TYPE MOWER
Filed Aug. 14, 1961  2 Sheets-Sheet 1
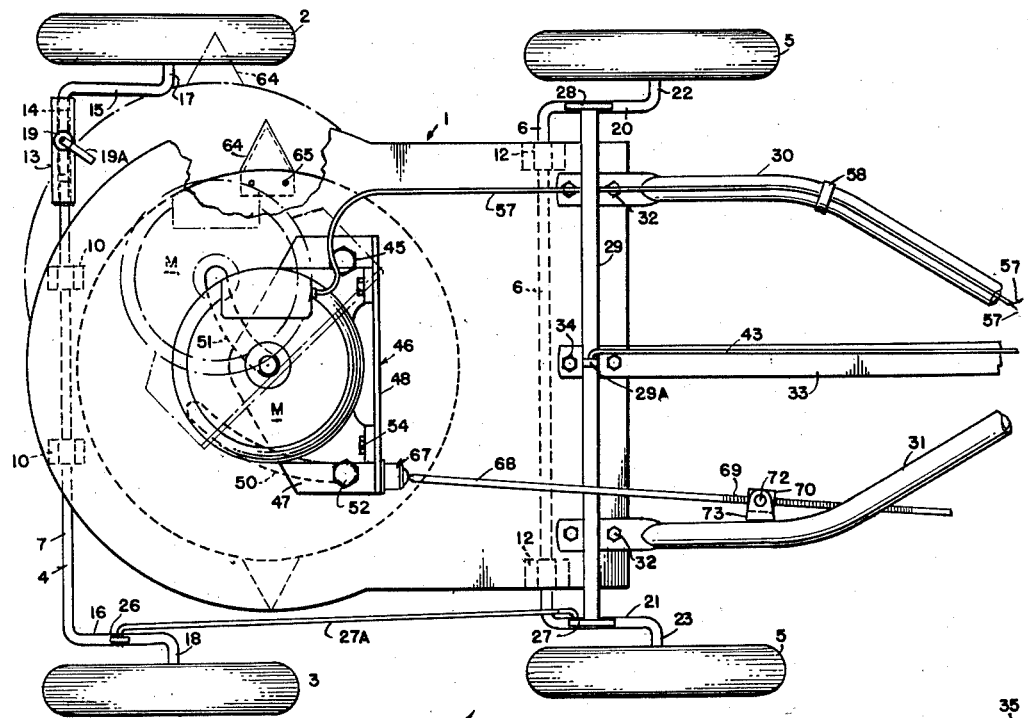
Fig. 1
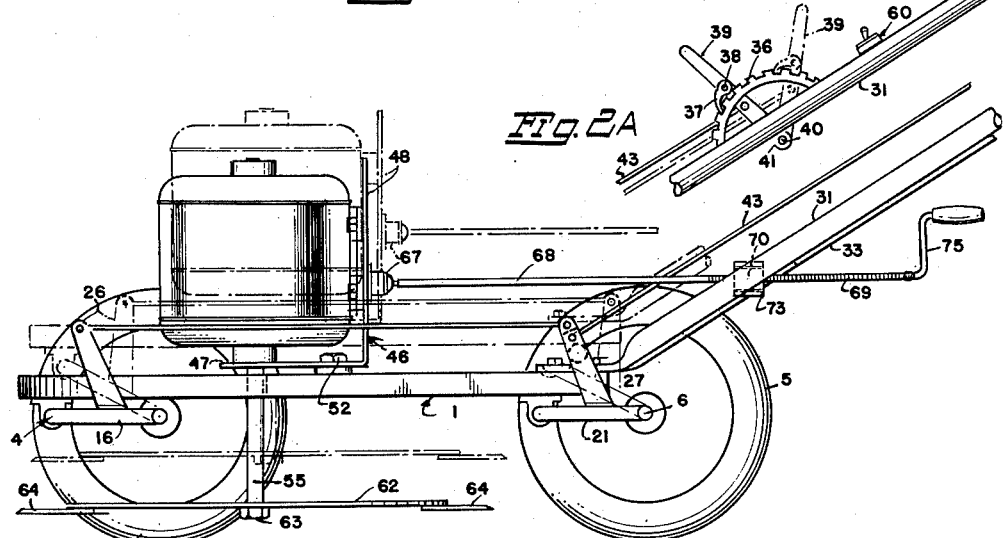
Fig. 2A
Fig. 2
LOUIS F. WHITMAN
INVENTOR.
BY James D. Girman
ATT'Y

LOUIS F. WHITMAN
*INVENTOR.*

United States Patent Office 3,093,947
Patented June 18, 1963

3,093,947
HORIZONTALLY ADJUSTABLE ROTATING
DISK TYPE MOWER
Louis F. Whitman, 2818 SE. Laurel, Milwaukie, Oreg.
Filed Aug. 14, 1961, Ser. No. 131,406
3 Claims. (Cl. 56—25.4)

This invention relates to lawn mowers and more particularly to power mowers of the "rotary" type. With conventional mowers of this type, it is mechanically impossible to satisfactorily cut or trim grass growing closely adjacent a wall, walkway, fence, the trunk of a tree, or other rigid structure.

Accordingly, it is one of the principal objects of the present invention to provide a mower so constructed that the orbit of rotation of the cutter blade may be moved laterally relative to the path of travel of the mower so as to bring the cutter or cutting blades into close proximity to the side of such structures.

It is a further object of the invention to provide means for protecting the cutter blade against accidental or unintentional contact with such structures. Said means being provided by rendering one of the ground engaging wheels vertically adjustable relative to the cutter blade to allow rotation of the cutter blade beneath the wheel while the wheel itself rolls against the side of said rigid structure.

A further object of the invention is to provide a power mower of this character having a vertically adjustable base member which base member can be conveniently adjusted at various positions between upper and lower limits whereby the height of the cut is adjustable while the mower is in forward or rearward motion and wherein such adjustment may be accomplished without the use of extra tools of any kind.

A further object is to provide a mower of the character described which is of simple, efficient, durable, and relatively inexpensive construction and wherein its several parts are readily accessible for adjustment, repair, or replacement.

The foregoing and other objects and advantages which will become subsequently apparent reside in the details of construction and operation as more fully hereinafter described and claimed, reference being had to the accompanying drawing forming a part hereof and in which:

FIGURE 1 is a top plan view of a power mower made in accordance with my invention and with a fragment broken away for convenience of illustration.

FIGURE 2 is a side elevational view of FIGURE 1 with two wheels on one side thereof removed for convenience of illustration.

FIGURE 2A is a continuation of FIGURE 2, and

Figure 3:
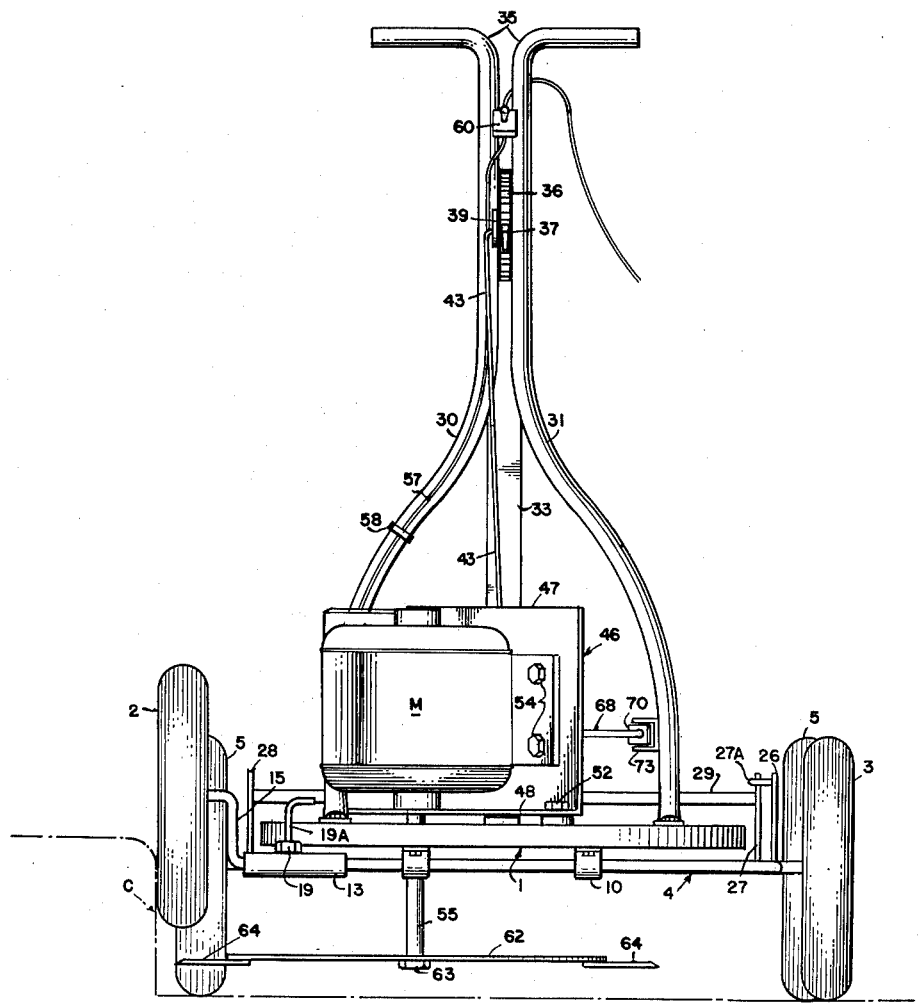
FIGURE 3 is a front elevational view of FIGURE 1.

With continuing reference to the drawings wherein like references of character designate like parts, reference numeral 1 indicates generally a main base supported upon front ground engaging idling wheels 2 and 3 rotatably attached to a two-piece axle indicated generally at 4, and a pair of rear ground engaging idling wheels 5 rotatably attached to an unitary axle 6. One piece 7 of the front axle is journalled in bearings 10 secured to the underside of the base 1 and the rear axle 6 is similarly journalled in bearings 12 also secured to the underside of the base 1.

To one end of the piece 7 of the front axle, I weld a sleeve 13 into which the inwardly turned end 14 of the other axle piece extends. Both axle pieces are bent rearwardly into parallel portions 15 and 16 respectively then outwardly into transversely aligned portions 17 and 18 to which portions the wheels 2 and 3 are rotatably mounted. A nut 19 is welded to the sleeve 13 and the threaded bottom end of a right angular locking screw 19A threadedly extends through the nut and to the interior of the sleeve. Thus the front wheel 2 may be raised and lowered relative to the ground and locked in any adjusted position by the locking screw 19A.

The rear axle 6 is similarly bent rearwardly into parallel portions 20 and 21 and outwardly as at 22 and 23 for rotatable mounting of the rear wheels 5. The portion 16 of the front axle and the portion 21 of the rear axle are provided with upstanding masts 26 and 27 respectively which are interconnected by a link 27A. The portion 20 of the rear axle 6 is provided with a mast 28 connected to the mast 27 by a bar 29 provided with a central lug 29a.

The rearward end of the base 1 is provided with an upwardly and rearwardly extending handle made of two tubular members or pipes 30—31 spread apart at their bottom ends as shown and thereat secured to the base 1 by suitable bolts or the like indicated at 32. A stiffening or re-enforcing bar 33 is secured to the base 1 as at 34 and welded to the underside of the handle members 30—31 where they converge from their spread bottom ends. The top end of the handle is turned outwardly into hand-grips as at 35. Near this end, and between the pipes, I mount a ratchet quadrant 36 for cooperation with a pawl 37 pivotally attached as at 38 to a lever 39 whose bottom end is pivotally attached as at 40 to a lug 41 welded to the handle between the pipes. The lever 39 is connected to the lug 29a on the cross-member 29 by a link 43.

From the foregoing it will be readily apparent that the base 1 may be raised from the full line lowered position to the broken line elevated position shown in FIGURE 2 by a rearward pull on the lever 39 and held in that position by engagement of the pawl 37 with the teeth of the ratchet 36.

Pivotally mounted for lateral swinging movement on top of the base 1 by means of a pivot bolt 45 fixedly offset from the longitudinal centerline of the base 1, is a motor mounting bracket indicated generally at 46 and comprising a horizontal portion 47 and a vertical portion 48.

The base is provided with a first arcuate slot 50 and a second arcuate slot 51 diagonally spaced apart as shown. A bolt 52 extends downwardly through the horizontal portion of the mounting bracket 46 and through the first slot 50 for guidance therealong. A motor M is secured as at 54 to the vertical portion 48 of the mounting bracket and the shaft 55 of the motor extends downwardly through the second slot 51 for guidance therealong. Electrical current is supplied to the motor M through conductors 57 attached as at 58 to the handle 30 and in circuit with a source of electrical current (not shown) through any suitable type of switch 60 secured to the handle near the hand grips 35.

A cutter disk 62 is secured in the conventional manner as at 63 to the bottom end of the motor shaft 55 and provided with at least two diametrically opposed cutter blades 64 secured to the disk as at 65.

A ball and socket member indicated generally at 67 is secured to one side of the vertical portion 48 of the motor mounting bracket 46 and connected to one end of an actuating shaft 68, threaded for a portion of its length as at 69 for threaded engagement with a nut 70 pivotally attached as at 72 to a bracket 73 welded to the handle member 31. To the outer end of the threaded portion of the shaft 68 I weld a crank handle 75. By this arrangement, after the front wall 2 has been elevated, rotation of the shaft 68 in one direction will swing the motor mounting bracket 56 and hence the motor and cutter disk and cutter blades through an arcuate path into the broken line position shown in FIGURE 1 to cut closely adjacent a wall, walkway, fence, tree trunk, or other rigid structure, as for example the curbing C of a sidewalk shown in FIGURE 3.

To permit such offset operation of the cutter blades, it is, of course, necessary to elevate the front wheel 2 as aforesaid in order to provide clearance for the cutter blades. To accomplish this, the locking screw 19A is rotated counter-clockwise as viewed in FIGURE 1 to release the inwardly turned end portion 14 of the wheel axle. The wheel and axle are then pivoted upwardly relative to the sleeve and to the ground and so locked by rotation of the locking screw in a clockwise direction.

When the wheel 2 is thus elevated, and the cutter blades orbiting beneath at, the wheel will rub against the curbing C and protect the rotating cutter blades 64 from damaging contact with the curbing.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A power lawn mower comprising a horizontally disposed base supported upon ground engaging wheels, an inclined handle extending upwardly and rearwardly from the base, said base having a first and a second arcuate slot therein, a prime mover having a vertically disposed shaft extending through said second slot, means swingably mounting said prime mover upon the base to permit movement of said shaft lengthwise of said second slot, means interconnected said prime mover mounting means and said handle for lockably securing said prime mover in various positions relative to said second slot, a cutter secured to said prime mover shaft below said base, means for elevating one of said ground engaging wheels to permit orbit of rotation of the cutter directly below said wheel when said prime mover shaft reaches the end of said second slot whereby said elevated wheel will serve as a guard between the cutter and a rigid structure adjacent the path of movement of the mower.

2. A power lawn mower comprising a horizontally disposed base supported upon ground engaging wheels,
   an inclined handle extending upwardly and rearwardly from the base,
   said base having a first and a second arcuate slot therein,
   a prime mover having a vertically disposed shaft extending through said second slot,
   means offset from the longitudinal centerline of said base swingably mounting said prime mover upon the base to permit movement of said shaft lengthwise of said second slot toward one of said wheels,
   means interconnecting said prime mover mounting means and said handle for lockably securing said prime mover in various positions relative to said second slot,
   a cutter secured to said prime mover shaft below said base,
   means for elevating said one of said ground engaging wheels to permit orbit of rotation of the cutter directly below said wheel when said prime mover shaft reaches the end of said second slot whereby said elevated wheel will serve as a guard between the cutter and a rigid structure adjacent the path of movement of the mower.

3. In a power lawn mower having a horizontally disposed base supported upon ground engaging wheels, an inclined handle extending upwardly and rearwardly from the base,
   the improvement comprising,
   said base having a first and a second arcuate slot therein,
   a prime mover having a vertically disposed shaft extending through said second slot,
   means offset from the longitudinal centerline of said base swingably mounting said prime mover upon the base to permit movement of said shaft lengthwise of said second slot toward one of said wheels,
   means interconnecting said prime mover mounting means and said handle for lockably securing said prime mover in various positions relative to said second slot,
   a cutter secured to said prime mover shaft below said base,
   means for elevating said one of said ground engaging wheels to permit orbit of rotation of the cutter directly below said wheel when said prime mover shaft reaches the end of said second slot whereby said elevated wheel will serve as a guard between the cutter and a rigid structure adjacent the path of movement of the mower.

References Cited in the file of this patent
UNITED STATES PATENTS

| | | |
|---|---|---|
| 2,143,057 | Danielson | Jan. 10, 1939 |
| 2,791,875 | Faas | May 14, 1957 |
| 2,836,430 | Langenbacher | May 27, 1958 |
| 2,848,859 | Abel | Aug. 26, 1958 |
| 2,865,159 | Musgrave | Dec. 23, 1958 |
| 2,909,021 | McLane | Oct. 20, 1959 |
| 2,960,811 | Roesel | Nov. 22, 1960 |